(12) United States Patent
Cathey, Jr. et al.

(10) Patent No.: US 7,550,701 B2
(45) Date of Patent: Jun. 23, 2009

(54) NON-LINEAR WAVEFRONT CODING SYSTEMS AND METHODS

(75) Inventors: W. Thomas Cathey, Jr., Boulder, CO (US); Adam Douglas Greengard, Louisville, CO (US)

(73) Assignee: OmniVision CDM Optics, Inc., Boulder, CO (US)

( * ) Notice: Subject to any disclaimer, the term of this patent is extended or adjusted under 35 U.S.C. 154(b) by 999 days.

(21) Appl. No.: 10/786,443

(22) Filed: Feb. 25, 2004

(65) Prior Publication Data

US 2004/0165253 A1 Aug. 26, 2004

Related U.S. Application Data

(60) Provisional application No. 60/449,944, filed on Feb. 25, 2003.

(51) Int. Cl.
*G01J 1/20* (2006.01)
(52) U.S. Cl. .................. 250/201.9; 382/255; 359/16
(58) Field of Classification Search .............. 250/201.9, 250/237 R; 382/255; 359/16
See application file for complete search history.

(56) References Cited

U.S. PATENT DOCUMENTS

| | | | | | |
|---|---|---|---|---|---|
| 3,980,879 | A | * | 9/1976 | O'Meara | 250/201.9 |
| 3,988,608 | A | * | 10/1976 | O'Meara | 250/201.9 |
| 4,035,060 | A | | 7/1977 | Tsunoda et al. | |
| 5,134,573 | A | * | 7/1992 | Goodwin | 382/141 |
| 5,367,375 | A | * | 11/1994 | Siebert | 356/520 |
| 5,426,521 | A | * | 6/1995 | Chen et al. | 359/9 |
| 5,473,473 | A | | 12/1995 | Estelle et al. | |
| 5,748,371 | A | * | 5/1998 | Cathey et al. | 359/558 |
| 6,061,169 | A | | 5/2000 | Feldman et al. | |
| 6,097,856 | A | * | 8/2000 | Hammond, Jr. | 382/312 |
| 6,295,156 | B1 | | 9/2001 | Feldman et al. | |
| 6,426,829 | B1 | | 7/2002 | Feldman et al. | |
| 6,449,236 | B2 | | 9/2002 | Wals et al. | |
| 6,483,627 | B2 | | 11/2002 | Feldman et al. | |
| 6,519,077 | B1 | | 2/2003 | Mizuuchi et al. | |
| 6,542,281 | B2 | | 4/2003 | Feldman et al. | |
| 6,653,613 | B1 | * | 11/2003 | Bucourt et al. | 250/201.9 |

(Continued)

FOREIGN PATENT DOCUMENTS

JP 2001194694 7/2001

(Continued)

OTHER PUBLICATIONS

Hausler, G., A Method To Increase The Depth of Focus By Two Step Image Processing; vol. 6, No. 1 Optics Communications, Sep. 1972.

(Continued)

*Primary Examiner*—Stephen Yam
(74) *Attorney, Agent, or Firm*—Lathrop & Gage LLP

(57) ABSTRACT

Systems and methods reduce aberrations in a wavefront imaged by an optical system having a non-linear detector. A wavefront of electromagnetic radiation from an object imaged to the non-linear detector is encoded. Data from the non-linear detector is digitally converted to form a digital representation of the image captured by the non-linear detector. The detected image is linearized to form a linearized image. The linearized image is filtered to reverse effects of wavefront coding to form a final image.

37 Claims, 6 Drawing Sheets

U.S. PATENT DOCUMENTS

| | | | |
|---|---|---|---|
| 6,735,017 | B1 | 5/2004 | Acosta et al. |
| 6,741,380 | B2 | 5/2004 | Feldman et al. |
| 6,753,909 | B1 | 6/2004 | Westerman et al. |
| 6,807,329 | B2 | 10/2004 | Zalevsky et al. |
| 6,879,427 | B2 | 4/2005 | Mendlovic et al. |
| 6,894,827 | B2 | 5/2005 | Mendlovic et al. |
| 6,937,381 | B2 * | 8/2005 | Kitamura et al. ............ 359/279 |
| 7,042,535 | B2 | 5/2006 | Katoh |
| 7,058,235 | B2 | 6/2006 | Wakamoto et al. |
| 7,186,968 | B2 | 3/2007 | Raynor |
| 7,206,121 | B2 | 4/2007 | Minami |
| 2004/0017601 | A1 | 1/2004 | Feldman et al. |
| 2006/0146233 | A1 | 7/2006 | Park |

FOREIGN PATENT DOCUMENTS

| | | |
|---|---|---|
| WO | WO03009008 A2 | 1/2003 |
| WO | WO2004029712 | 4/2004 |

OTHER PUBLICATIONS

Greengard, Adam, et al. "Extended Depth of Field With a Nonlinear Silver-Halide Emulsion Detector" Applied Optics, vol. 41, No. 29, Oct. 10, 2002.

M. Mino, Y. Okano, "Improvement in the Optical Transfer Function of a Defocused Optical System Through the Use of Shaded Apertures," Applied Optics vol. 10, pp. 2219-2225 (1997).

J. Ojeda-Castaneda, P. Andres, A. Diaz, "Annular Apodizers for Low Sensitivity to Defocus and to Spherical Aberation," Optical Letters vol. 11, pp. 487-489 (1986).

J. Ojeda-Castaneda, E. Tepichin, A. Noyola-Isgleas, "High Focal Depth by Apodization and Digital Restoration," Applied Optics vol. 27, pp. 2583-2586 (1988).

J. Ojeda-Castaneda, E. Tepichin, A. Diaz, "Arbitrarily High Focal Depth with a Quasioptimum Real and Positive Transmittance Apodizer," Applied Optics vol. 28, pp. 2666-2670 (1990).

J. Ojeda-Castaneda, L. R. Berriel-Valdos, "Zone Plate for Arbitrarily High Focal Depth," Applied Optics vol. 29, pp. 994-997 (1972).

Edward R. Dowski, Jr., W. Thomas Cathery, "Extended Depth of Field Through Wave-front Coding," Applied Optics vol. 34, No. 11, pp. 1859-1866 (1995).

Kodak Technical Data, "Kodak Professional T-Max Films", http://www.kodak.com/global/en/professional/support/techPubs/f4016/f4016.pdf;jsessionid=145M2SXDAJGWRQHIO3JXWJI, pp. 26, Oct. 2007.

Adam Douglas Greengard, "Extended Depth Of Field With A Nonlinear Silver Halide Emulsion Detector" Thesis University of Colorado Department of Electrical Engineering, Thesis defended Mar. 2003, catalogued and available in University of Colorado library Feb. 2005.

Sara Bradburn, Wade Thomas Cathey, Edward R. Dowski, Jr., "Realizations of focus invariance in optical-digital systems with wavefront coding," Applied Optics vol. 36, No. 35, pp. 9165-9166 (1997).

The Editors of Time-Life Books, Light and Film, (Time-Life Books, New York, 1970) pp. 122-130.

W. T. Cathey, Optical Information Processing and Holography, (John Wiley & Sons, Inc., New York, 1974) pp. 126.

Bahaa E. A. Saleh and Malvin Carl Teich, Fundamentals of Photonics, (John Wiley & Sons, Inc., New York, 1991) pp. 111-112.

Albert Rose, Vision: Human and Electronic, (Plenum Press, New York, 1973) pp. 85-87.

H. M. Nussenzveig, Introduction to Quantum Optics, (Gordon & Branch Science Publishers, New York, 1973), p. 75-76.

Albert Rose, Vision: Human and Electronic, (Plenum Press, New York, 1973) pp. 3-12.

Joseph W. Goodman, Introduction to Fourier Optics, (McGraw-Hill Publishing, New York, 1988) pp. 90-96 and 106-110.

Robert A. Gabel, Richard A. Roberts, Signals and Linear Systems, (John Wiley & Sons, New York, 1973) pp. 278-279.

* cited by examiner

NON-LINEAR WAVEFRONT CODING SYSTEMS AND METHODS

RELATED APPLICATIONS

This application claims priority to U.S. provisional application Ser. No. 60/449,944, filed 25 Feb. 2003 and hereby incorporated by reference.

BACKGROUND

Traditional optical imaging system design has focused on the combination of certain optics with an image detector. The optics may include, for example, lenses that focus and magnify images. The image detector may be a non-linear detector (e.g. film) or a linear detector (e.g., CCD array) that detects the optical radiation to form an image. The detected image may then undergo traditional image processing techniques—such as edge sharpening and color filter array (CFA) color interpolation—to improve certain aspects of the image. Thus, traditional optics in imaging systems are designed to form images at the detector that are sharp and clear over a range of field angles, illumination wavelengths, temperatures, and focus positions.

Traditional imaging systems, however, suffer from a number of setbacks. First, such systems typically have a relatively low depth of field, making it difficult to accurately and fully image real objects. The depth of field refers to the range of distances over which an optical imaging system can produce an in-focus image. Since the range of the depth of field is inherently limited, there are problems associated with imaging an object wherein its dimensions exceed the depth of field, as some portion of the image will be out of focus and blurry. To overcome this low depth of field, additional optical elements may be employed, for example an optical power absorbing apodizer or a stopped down aperture. However, overcoming low depth of field in these ways significantly reduces the optical energy at the image plane and decreases image resolution. The decrease of optical energy and increase in image noise may be at least partially remedied by adding significant illumination to the traditional imaging system; but this adds weight, complexity and expense to the design.

Misfocus-related aberrations, and control of such, present other problems in traditional imaging systems. Misfocus-related aberrations include, for example, chromatic aberration, curvature of field, spherical aberration, astigmatism, and temperature or pressure related misfocus; such aberrations cause image blurring and loss of resolution, and can make image colors appear shifted or otherwise incorrect. Traditional imaging systems remedy such aberrations by adding lens elements that increase cost, weight and overall lens complexity.

Consequently, traditional imaging systems must make a trade-off between (a) good images that generally require complex optical designs and (b) lower quality images that reduce size, weight, and/or the number of optical elements in the optical design.

Extended depth of field incoherent optical imaging systems (sometimes denoted as WAVEFRONT CODED® imaging systems) have been developed as an improvement over traditional imaging systems. These systems extend the depth of field (or depth of focus) properties in the imaging system by encoding the wavefront ("wavefront coding") as it is processed through the imaging system. U.S. Pat. No. 5,748,371, issued to Cathey, Jr. et al., provides certain useful background on wavefront coding and is incorporated herein by reference.

One principle underlying wavefront coding is that an optical system, under incoherent illumination, forms a linear system with respect to intensity. As a result, wavefront coding is used with linear digital detectors (e.g., CCD array, CMOS arrays, etc.) since digital detectors can have a linear response to the intensity of optical radiation. Photographic film and many other detectors do not, however, demonstrate such a linear response. Even digital detectors, especially CMOS detectors, can be intentionally designed to exhibit a non-linear response. One reason to design such non-linearities is to extend the dynamic range of the detector; for example, the circuit around each pixel may be configured to produce a response that is logarithmic instead of linear. Another reason to design such non-linearities is to cause any portion of the image below a threshold of the detector not to be imaged.

SUMMARY OF THE INVENTION

In one embodiment, a non-linear optical system images an object. Optics focus and encode a wavefront from the object to an intermediate image such that an optical transfer function of the optical system, at the intermediate image, is more invariant to focus-related aberrations as compared to an intermediate image formed by the optics without encoding. A non-linear detector detects the intermediate image. A linearization processor (e.g., implementing a linearization process) electronically captures the intermediate image.

In another embodiment, a method reduces aberrations in a wavefront imaged by an optical system having a non-linear detector. A wavefront of electromagnetic radiation from an object imaged to the non-linear detector is encoded. Data from the non-linear detector is digitally converted to form a digital representation of the image captured by the non-linear detector. The detected image is linearized to form a linearized image. The linearized image is filtered to reverse effects of wavefront coding to form a final image.

DETAILED DESCRIPTION OF THE INVENTION

Figure 1:
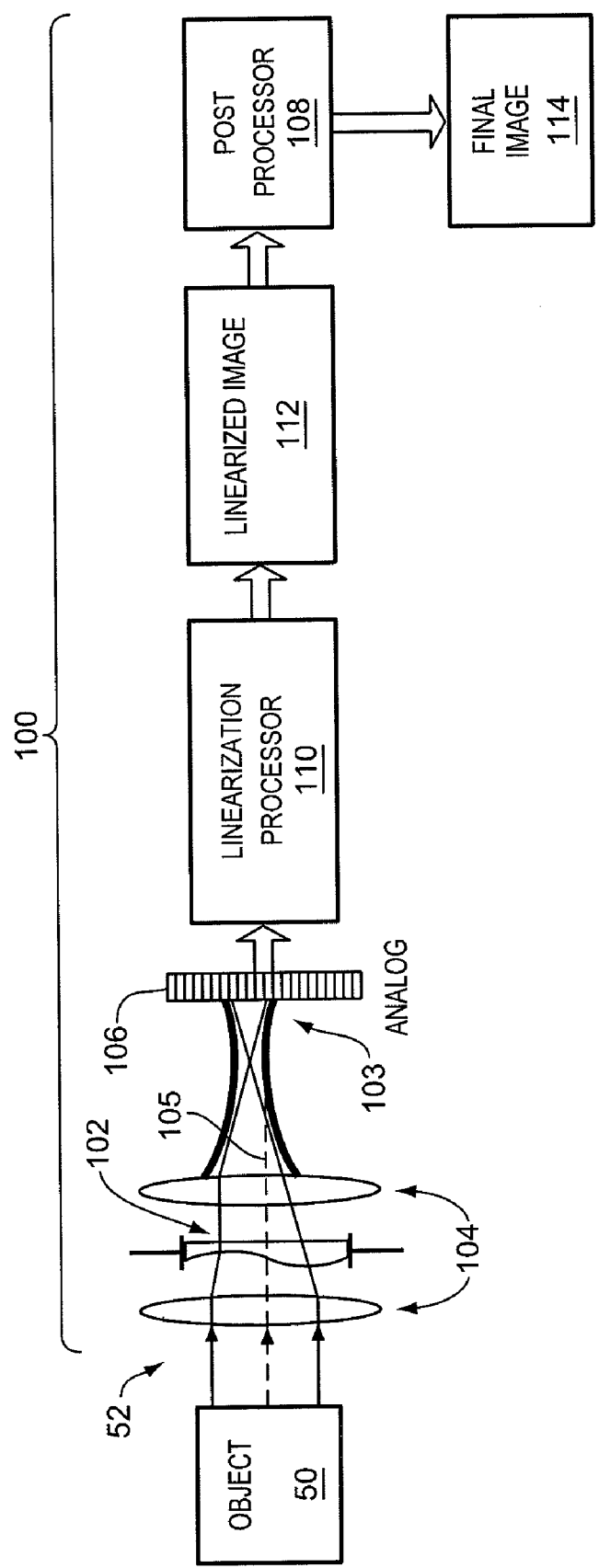
FIG. 1 depicts a non-linear wavefront coded imaging system.

A non-linear imaging system 100 that extends depth of field is shown generally in FIG. 1. System 100 includes (a) optics 102 that may, for example, take the form of an optical phase mask, (b) optical elements (e.g., lenses and/or mirrors) 104, (c) a non-linear detector 106, and (d) a post processor 108. Optics 102 and elements 104 cooperate to image electromagnetic radiation 52 from object 50 to an intermediate image 103, which is then captured by non-linear detector 106. Electromagnetic radiation 52 may be in one or more of the visible spectrum, infrared spectrum, ultraviolet spectrum, radio wave spectrum, or another part of the electromagnetic spectrum. Optics 102 "encode" the optical wavefront within system 100, as described below, to spatially blur points of imaged object 50 about intermediate image 103 (e.g., along optical axis 105).

Figure 2B:
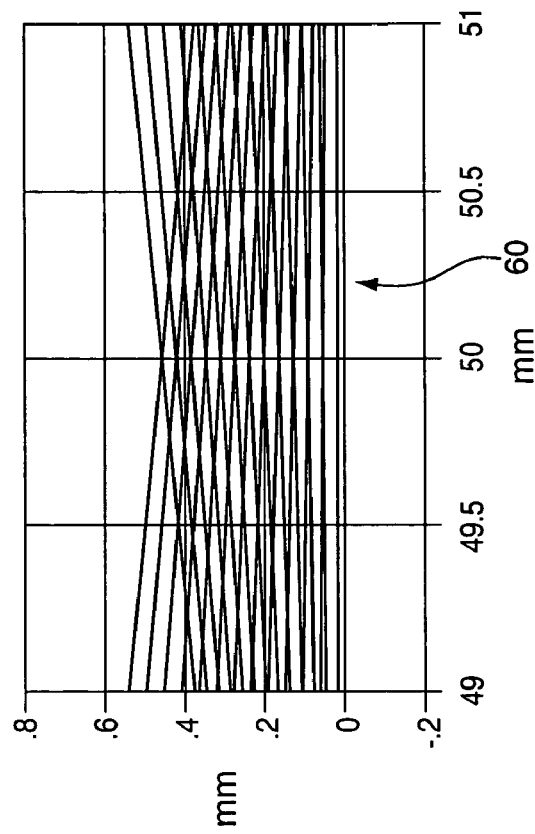
FIG. 2B shows ray intercept diagrams for the optical imaging system of FIG. 1.
Figure 2A:
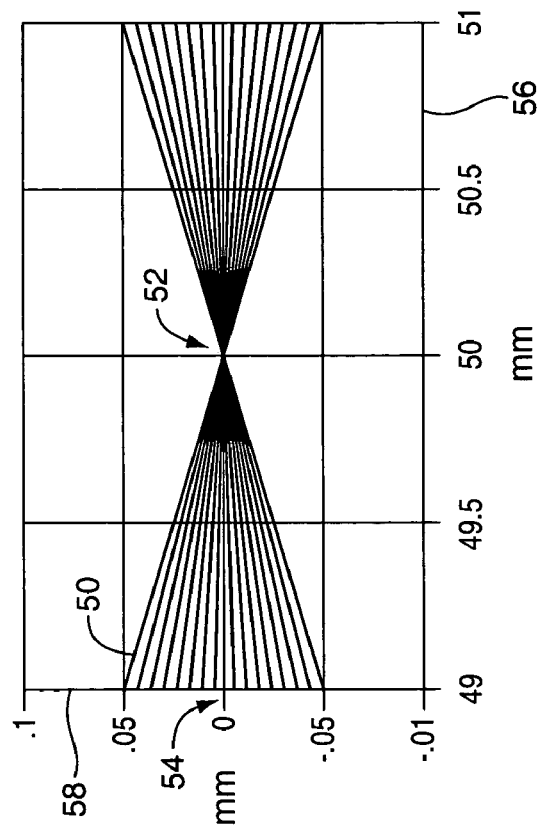
FIG. 2A shows ray intercept diagrams for a traditional optical imaging system.

Intermediate image 103 does not, therefore, occupy a single focal point as in traditional imaging systems. An exemplary ray path-based explanation of the difference between traditional imaging systems and imaging system 100 is illustrated in FIGS. 2A and 2B. In particular, FIG. 2A shows optical rays 50 from an ideal traditional lens focusing parallel light. Optical rays 50 converge to a focal point 52 at the optical axis 54, with the best focus image plane at 50 mm on the horizontal axis 56 (the vertical axis 58 represents distance from the on-axis position). The ray density of the traditional imaging system is thus maximally sensitive to movement of the image plane or misfocus. FIG. 2B, on the other hand, illustrates optical rays 60 from imaging system 100 (in an exemplary embodiment), with optics 102 providing a cubic phase surface. As shown, optical rays 60 no longer travel towards a point of best focus, but instead travel so that the distribution of rays 60 is substantially insensitive to position of the image plane. Intermediate image 103 of an object point is therefore not a point image, but is instead a specialized blur.

A linearization processor 110 linearizes data from detector 106. By way of example, if non-linear detector 106 is photographic film, linearization processor 110 may include a digital scanner than scans the photographic image of intermediate image 103. In another example, if non-linear detector 106 is a non-linear digital detector (e.g., a CMOS array with a non-linear circuit, or detector elements with individual, non-linear responses), then linearization processor 110 may include digital processing to linearize digital data from detector 106. In one embodiment, data from detector 106 is linearized by linearization processor 110 to form linearized image 112 by utilizing a priori knowledge of the exposure curve of detector 106 (for example the gamma curve of photographic film as detector 106), and/or by measuring the exposure curve.

In one embodiment, linearized image 112 is a linear representation of intermediate image 103 which would have been captured by a linear detector in place of non-linear detector 106. In the embodiment, post-processor 108 then processes or filters linearized image 112 by removing wavefront coding effects of mask 102 to form a final image 114 with increased depth of field and/or reduced focus-related aberration(s). Final image 114 is a sharp (e.g., in-focus) image as compared to intermediate image 103.

In one embodiment, optics 102 include a phase profile (e.g., circularly symmetric or non-circularly symmetric profile (e.g., cubic)) that modifies the optical transfer function of imaging system 100 by affecting a phase of light transmitted by the phase profile. Optics 102 may be positioned at or near a principal plane of system 100; at or near an image of the principal plane; at or near an aperture stop of system 100; at or near an image of the aperture stop, or at or near a lens (e.g., a lens 104) of system 100, so that non-linear detector 106 presents the only substantial non-linearity in system 100. Non-linear detector 106 may be made of any type of non-linear media, such as photographic film or specially designed digital detectors that exhibit a non-linear response based on exposure. In yet another aspect, the non-linearity is such that the portion of the image below a threshold of the non-linear detector is not recorded.

As noted above, linearization processor 110 may include digital scanning of non-linear detector 106 with a conventional digital scanner. An exemplary digital scanner configured for scanning photographic film as non-linear detector 106 may be a Nikon Super Coolscan 4000 film scanner at 4000 dots per inch, with a bit depth of 8-bits and with sixteen times averaging to reduce CCD array noise. An exemplary photographic film as non-linear detector 106 may be Kodak T-Max 100 black-and-white negative film, which may be developed with a Kodak T-Max developer in a 1:3 dilution for seven minutes at 72° F., prior to being digitally scanned, such as illustrated in FIG. 3.

Figure 3:
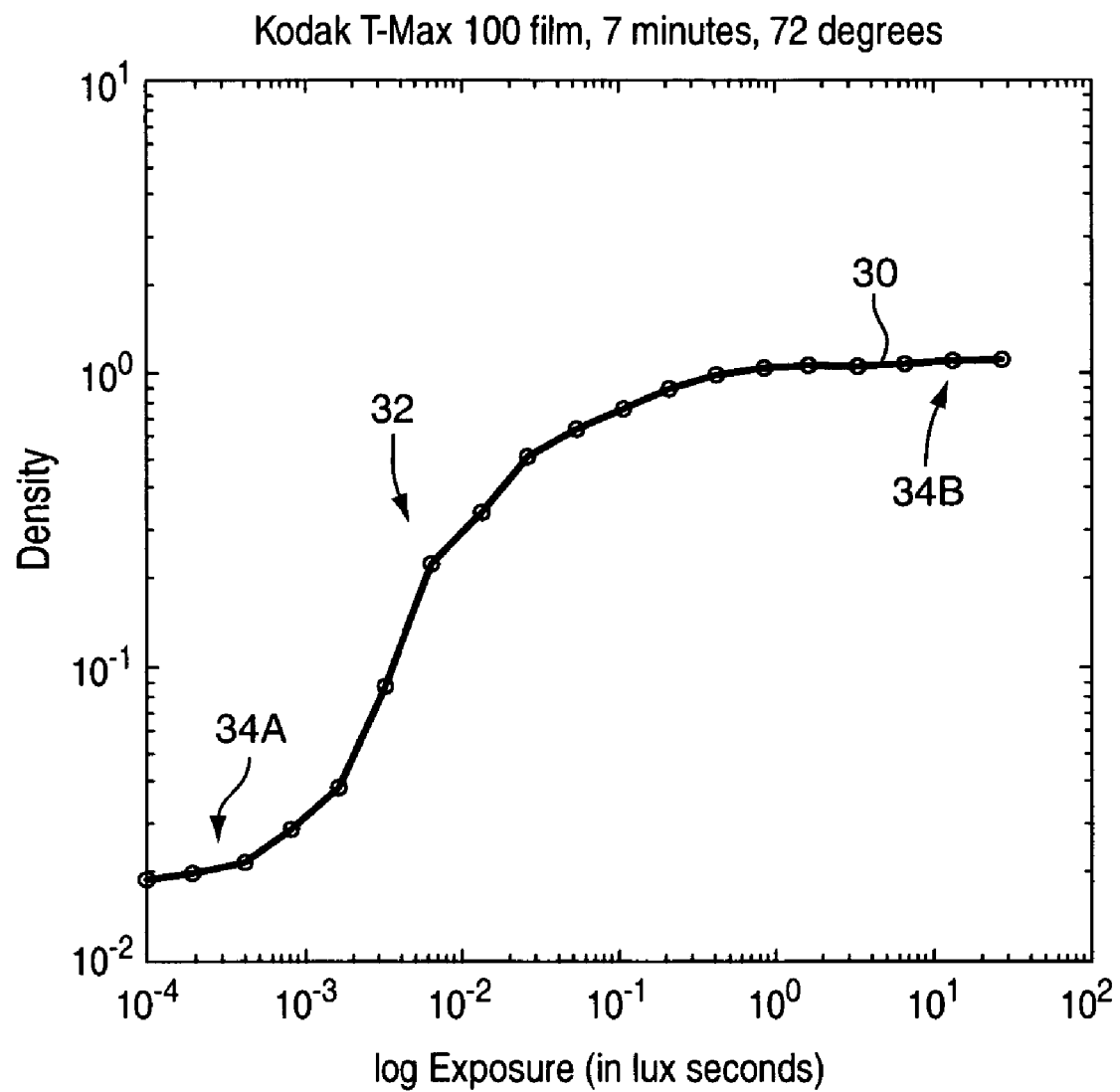
FIG. 3 shows a graph of an exposure curve for a non-linear detector.

More particularly, FIG. 3 shows a graph of exposure versus density in a typical negative film, illustrating properties of detector 106 when detector 106 is this particular film. Underexposed regions of the film fall to the left of curve 30 (i.e., within non-linear regions 34A) and overexposed regions of the film fall to the right of curve 30 (i.e., within non-linear regions 34B). There is a linear region 32 to curve 30; however, the dynamic range of a typical image captured on the film will often extend outside of linear region 32 and into non-linear areas 34. Typically, negative films are overexposed rather than risking underexposure, so it is more likely that images will be overexposed in nonlinear regions 34B. The underexposed region may fall below an intensity threshold so that no image is recorded in that underexposed region.

In one embodiment, linearization process 110 for a particular non-linear detector 106 begins with estimating the highest density in intermediate image 103 captured by detector 106. Alternatively, the highest density in intermediate image 103 is measured with a densitometer, such that density estimation is unnecessary. Then, using a part of the non-linear exposure curve of non-linear detector 106 that ranges from the lowest region of the curve (e.g., underexposed region 34A of curve 30, FIG. 3) to the estimated or measured highest density (e.g., region 34B, FIG. 3), a look up table is constructed by solving for integer values of the non-linear exposure curve to map its values to generate linearized image 112.

Figure 4:
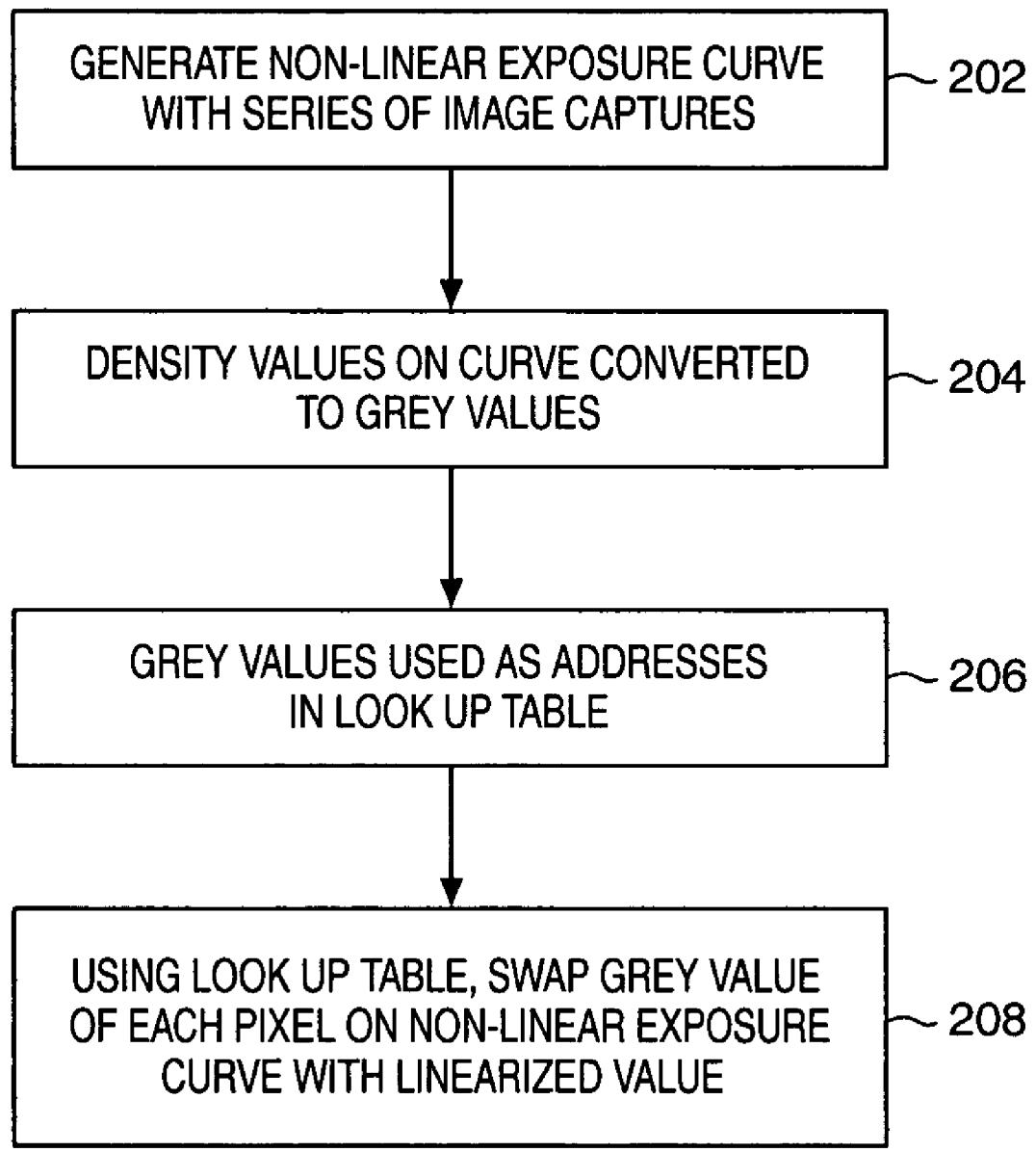
FIG. 4 illustrates a linearization processor for use with image capture by a non-linear detector.

Linearized image 112 may be generated by the linearization process 200 shown in FIG. 4. At step 202, a non-linear exposure curve is generated by capturing a series of images of uniform intensity across an image plane of system 100, to create a uniform density on film. The captured images vary by exposure time and are digitally scanned and utilized within linearization processor 110. With the non-linear exposure curve, at step 204, the density values are converted to grey values. Then, at each sample image captured on the non-linear exposure curve, the grey value is used as an address in a lookup table, and the value of a linear curve at that sample image is used as the data at that address in the lookup table, at step 206. Using this lookup table, the captured images are scanned through, and the grey value of each pixel that originally resided on the non-linear exposure curve is swapped with the linearized value entered at the corresponding address in the lookup table, at step 208.

Linearization process 200 is described for black-and-white imaging with non-linear detector 106. Process 200 may also be applicable for color imaging, for example with color film as non-linear detector 106, by performing the steps of process 200 separately for each of the red, green and blue channels in the detected intermediate image 103. In this way, post processor 108 then combines the separate channels to form final image 114.

Figure 5:
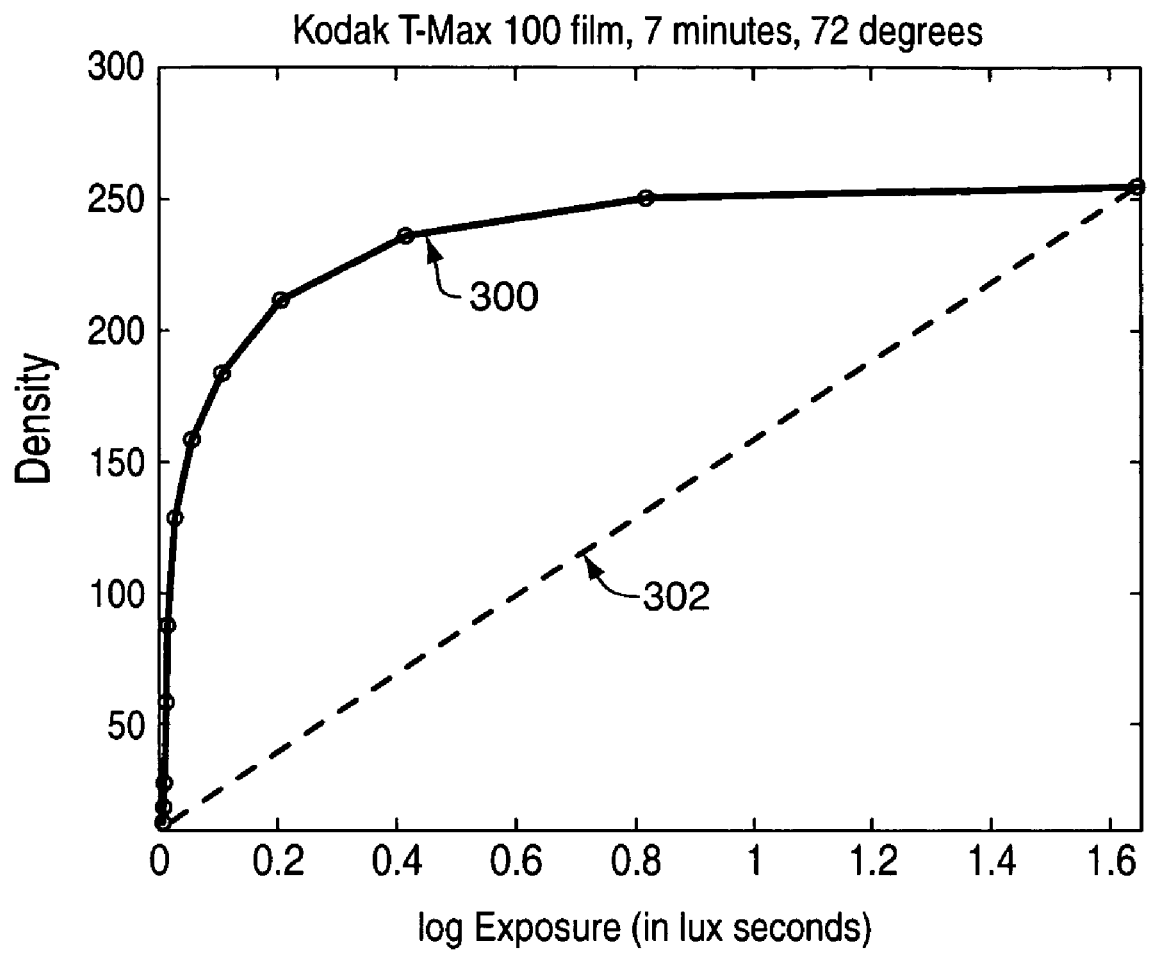
FIG. 5 shows a graph of a non-linear exposure curve for negative film and linear exposure curve.

FIG. 5 shows an exemplary graph of negative film exposure versus density of the captured images and plots for the non-linear exposure curve 300 and the linear exposure curve 302. These are exposure curves for Kodak T-Max 100 film, developed in a Kodak T-Max developer for seven minutes at 72° F. As exposure increases for a particular image, the linearization process brings about noise gain in the image; however, this is offset by improved contrast. Specifically, contrast, which is related to the slope of the exposure curve, decreases upwardly on non-linear exposure curve 300 into the overexposed region; but the contrast on linear exposure curve 302 is constant. Therefore, the higher the image intensity on non-linear exposure curve 300, the greater the noise gain realized; however increased contrast offsets the noise gain. The increased contrast and increased depth of focus of imaging system 100 thus provide benefit when imaging with non-linear detector 106.

Post processor 108 performs filtering on linearized image 112 to form final image 114, by taking into account the spatial blur applied by optics 102 while preserving the increase in depth of field and/or the reduction of focus-related aberrations. In one exemplary arrangement of post processor 108 as a filter, a Fourier-domain equation is used to calculate the filter:

$$F(v, \xi) = \frac{W(v, \xi) H*(v, \xi)}{H(v, \xi) H*(v, \xi) + \sigma},$$

where $F(v,\xi)$ is the filter, W is the ideal diffraction-limited OTF, and H is the input data (H* is the complex conjugate of H). H is an OTF given by an experimentally determined PSF. The above equation is computed separately at each frequency pair $(v, \xi)$ to build the filter. The bandwidth of the filter is determined by the bandwidth of the ideal OTE, W. The ideal OTF represents on-axis linear imaging at a best focus position. $\sigma$ is the Weiner parameter.

The difference in PSFs among different exposure levels on non-linear detector 106 presents a concern, as these levels are considered noise. To estimate the value of the Weiner parameter, the variance of the difference between the PSF used to determine the filter (one of the set of various exposure levels, or an average of several exposure levels) and the PSFs of different exposure levels is calculated. A reliable estimate for $\sigma$ is the largest of the variances divided by four. Another metric to determine $\sigma$ is the noise gain of the filter, given by the square root of the sum of squared filter coefficients, given that the filter coefficients sum to one. The larger the value of $\sigma$ the smaller the noise gain. Noise gains near two are generally the best results when acting on the set of PSEs of different exposure levels.

In an experimental set-up using Kodak T-Max 100 film as non-linear detector 106 (developed in a Kodak T-Max developer for seven minutes at 72° F.), a series of point spread functions (PSFs) were developed, each successive PSF image having double the exposure time of the previous PSF. These non-linearized PSFs were taken directly from a film scanner. Then, the PSFs were linearized and filtered by a filter generated by the average of the four middle exposed non-linearized PSFs. The resulting, linearized were more clearly alike, as compared to the non-linearized PSFs, thus providing more consistent response over varying exposure levels. Moreover, energy within the linearized PSFs appeared more concentrated in the center of each image, and there was also less noise within the images.

Figure 6A:
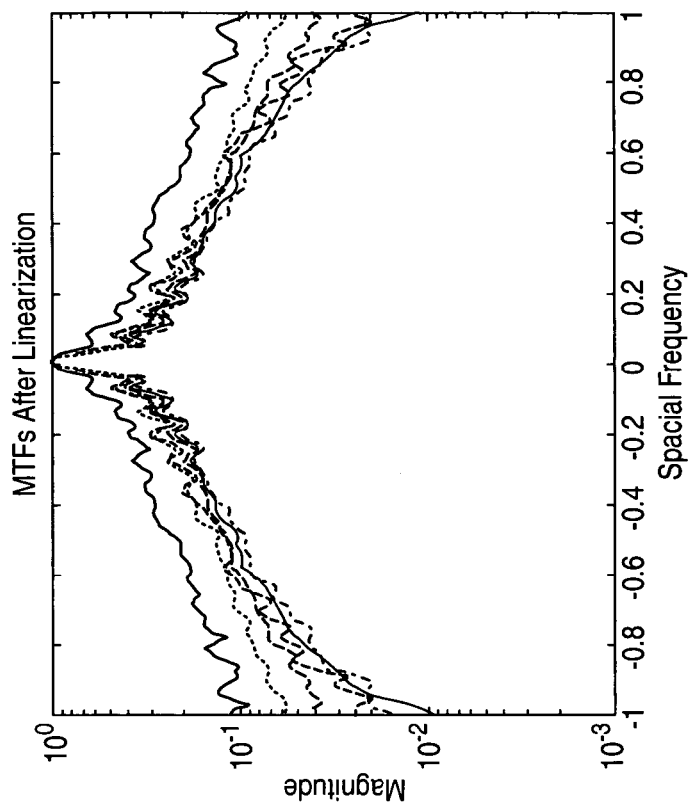
FIG. 6A illustrates a series of modulation transfer functions corresponding to the series of point spread functions for a wavefront imaged on an analog detector without linearization.

FIG. 6A shows normalized MTFs corresponding to each non-linearized PSF described above in connection with the experimental set-up. MTFs are the modulus of the corresponding OTFs, and are plotted as magnitude versus normalized frequency values. The MTFs of FIG. 6A show the effects of non-linearities by the separation between MTFs for different exposure values. If the optical imaging system were linear, then the normalized MTFs would substantially lie on top of one another, as the only significant difference between the MTFs would be a scaling factor, which is removed when the MTFs are normalized. The shape of each MTF in FIG. 6A also varies across the normalized frequency values for each exposure, illustrating the non-linearities.

Figure 6B:
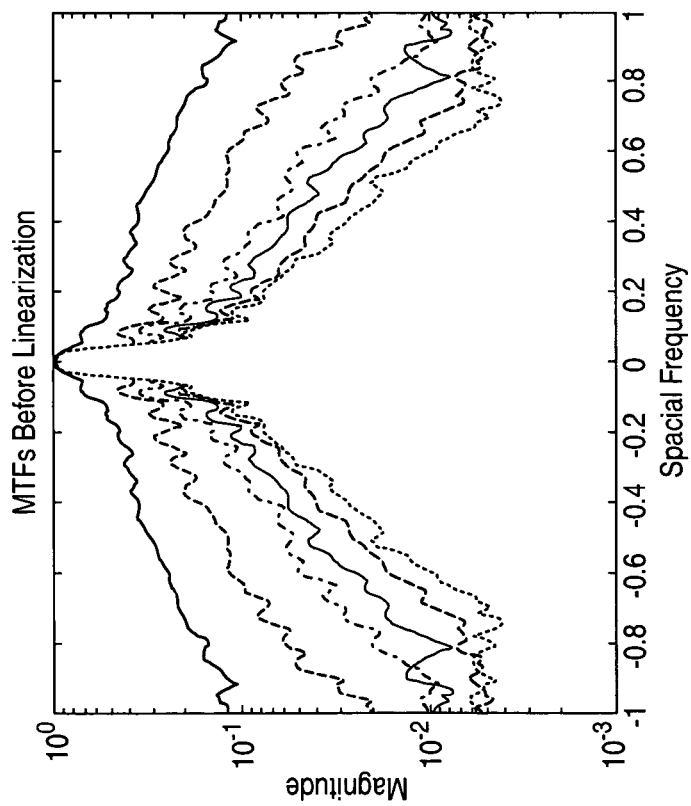
FIG. 6B shows a series of modulation transfer functions corresponding to the series of point spread functions for a wavefront imaged on a non-linear detector with linearization.

FIG. 6B shows the normalized MTFs corresponding to each linearized PSF from the experimental set-up. These MTFs are closer together across the normalized frequency values for each exposure. Because of improved this linearization, removal of effects of wavefront coding, by post processor 108, is more easily achieved.

Since certain changes may be made in the above methods and systems without departing from the scope hereof, it is intended that all matter contained in the above description or shown in the accompanying drawing be interpreted as illustrative and not in a limiting sense. It is also to be understood that the following claims are to cover certain generic and specific features described herein.

What is claimed is:

1. A non-linear optical system for imaging an object comprising:
   optics for focusing and encoding a wavefront from the object to an intermediate image such that an optical transfer function of the optical system, at the intermediate image, is more invariant to focus-related aberrations as compared to an intermediate image formed by the optics without encoding;
   a non-linear detector for detecting the intermediate image, the non-linear detector having an intensity threshold, wherein any part of the intermediate image that is below the intensity threshold is not detected by the nonlinear detector; and
   a linearization processor for linearizing the intermediate image to form a linearized image.

2. The optical system of claim 1, wherein the optics comprise a phase mask that modifies the optical transfer function of the optical system by affecting phase of the wavefronts transmitted by the phase mask.

3. The system of claim 1 wherein the aberrations include one or more of misfocus, spherical aberration, astigmatism, field curvature, chromatic aberration, temperature induced misfocus aberration, and pressure induced misfocus aberration.

4. The system of claim 1, wherein the non-linear detector comprises film.

5. The system of claim 1, wherein the optics comprise an optical element with an aspheric phase profile.

6. The system of claim 5, wherein the optical element is positioned at one or more of a principal plane of the imaging system, an image of the principal plane, an aperture stop of the imaging system, and an image of the aperture stop.

7. The system of claim 1, further comprising a post processor for filtering the linearized image by removing effects of wavefront coding therefrom to form a final image.

8. The system of claim 1, wherein the linearization processor linearizes the intermediate image by measuring an exposure curve within an image detected by the non-linear detector and by converting the exposure curve into a substantially linear exposure curve.

9. The system of claim 8, the exposure curve comprising an overexposed region and an underexposed region, wherein any part of an image falling into the underexposed region or the overexposed region is not recorded by the detector.

10. The system of claim 1, the non-linear detector comprising a non-linear digital detector.

11. The system of claim 10, wherein the non-linear digital detector comprises CMOS detector elements and circuitry to extend dynamic range.

12. The system of claim 10, wherein the non-linear digital detector comprises a digital circuit with different responses for different pixels.

13. The system of claim 10, wherein the non-linear digital detector comprises a digital circuit with detectors having logarithmic response.

14. A method for reducing aberrations in a wavefront imaged by an optical system having a non-linear detector, comprising:
   encoding a wavefront of electromagnetic radiation from an object imaged to the non-linear detector;
   digitally converting data from the non-linear detector to form a digital representation of the image captured by the detector;
   linearizing the detected image to form a linearized image wherein said step of linearizing comprises the steps of measuring an exposure curve for the image detected by the non-linear detector and converting the exposure curve into a substantially linear exposure curve; and
   filtering the linearized image to reverse effects of wavefront coding to form a final image.

15. The method of claim 14, wherein the step of encoding a wavefront comprises the step of coding the wavefront with a phase mask that modifies the optical transfer function of the optical system by affecting the phase of the wavefront transmitted by the phase mask.

16. The method of claim 14, wherein linearizing the detected image comprises the step of:
   determining the approximate value of the highest density in the image detected by the non-linear detector;
   wherein converting the exposure curve into a substantially linear exposure curve comprises:
   generating a look up table by solving for integer values on the exposure curve between the approximate highest density value and a low density value; and
   mapping the values in the look up table onto the substantially linear exposure curve.

17. The method of claim 15, wherein filtering the linearized image of the wavefront is performed by a filter defined by the Fourier-domain equation:

$$F(v, \xi) = \frac{W(v, \xi) H*(v, \xi)}{H(v, \xi) H*(v, \xi) + \sigma},$$

where F(v, ξ) is the filter, W is the ideal diffraction-limited optical transfer function, H is the input data (H* is the complex conjugate of H), and σ is the Weiner parameter.

18. The method of claim 14, wherein the aberrations include one or more of misfocus, spherical aberration, astigmatism, field curvature, chromatic aberration, temperature induced misfocus aberration, and pressure induced misfocus aberration.

19. The method of claim 14, wherein the non-linear detector is an analog film.

20. The method of claim 14, wherein encoding the wavefront comprises utilizing a phase mask.

21. A method for reducing aberrations in a wavefront imaged by an optical system having a non-linear detector, comprising:
   setting an intensity threshold of the non-linear detector, wherein any part of an intermediate image below the intensity threshold is not detected by the non-linear detector;
   encoding a wavefront of electromagnetic radiation from an object imaged to the non-linear detector;
   digitally converting data from the non-linear detector to form a digital representation of the image captured by the detector;
   linearizing the detected image to form a linearized image; and
   filtering the linearized image to reverse effects of wavefront coding to form a final 22. The method of claim 21, wherein the step of encoding a wavefront comprises the step of coding the wavefront with a phase mask that modifies the optical transfer function of the optical system by affecting the phase of the wavefront transmitted by the phase mask.

23. The method of claim 21, wherein the step of linearizing the detected image comprises the steps of measuring an exposure curve for the image detected by the non-linear detector and converting the exposure curve into a substantially linear exposure curve.

24. The method of claim 21, wherein linearizing the detected image comprises the step of:
   determining the approximate value of the highest density in the image detected by the non-linear detector;
   wherein converting the exposure curve into a substantially linear exposure curve comprises:
   generating a look up table by solving for integer values on the exposure curve between the approximate highest density value and a low density value; and
   mapping the values in the look up table onto the substantially linear exposure curve.

25. The method of claim 21, wherein filtering the linearized image of the wavefront is performed by a filter defined by the Fourier-domain equation:

$$F(v, \xi) = \frac{W(v, \xi) H^*(v, \xi)}{H(v, \xi) H^*(v, \xi) + \sigma},$$

where F(v,ξ) is the filter, W is the ideal diffraction-limited optical transfer function, H is the input data (H* is the complex conjugate of H), and σ is the Weiner parameter.

26. The method of claim 21, wherein the aberrations include one or more of misfocus, spherical aberration, astigmatism, field curvature, chromatic aberration, temperature induced misfocus aberration, and pressure induced misfocus aberration.

27. The method of claim 21, wherein the non-linear detector is an analog film.

28. The method of claim 21, wherein modifying the wavefront comprises utilizing a phase mask.

29. A non-linear optical system for imaging an object comprising:
   optics for focusing and encoding a wavefront from the object to an intermediate image such that an optical transfer function of the optical system, at the intermediate image, is more invariant to focus-related aberrations as compared to an intermediate image formed by the optics without encoding;
   a non-linear detector for detecting the intermediate image; and
   a linearization processor for linearizing the intermediate image to form a linearized image, by measuring an exposure curve within an image detected by the nonlinear detector and by converting the exposure curve into a substantially linear exposure curve.

30. The optical system of claim 29, wherein the optics comprise a phase mask that modifies the optical transfer function of the optical system by affecting phase of the wavefronts transmitted by the phase mask.

31. The system of claim 29, wherein the aberrations include one or more of misfocus, spherical aberration, astigmatism, field curvature, chromatic aberration, temperature induced misfocus aberration, and pressure induced misfocus aberration.

32. The system of claim 29, further comprising a post processor for filtering the linearized image by removing effects of wavefront coding therefrom to form a final image.

33. The system of claim 29, the exposure curve comprising an overexposed region and an underexposed region, wherein any part of an image falling into the underexposed region or the overexposed region is not recorded by the detector.

34. The system of claim 29, the non-linear detector comprising a non-linear digital detector.

35. The system of claim 34, wherein the non-linear digital detector comprises CMOS detector elements and circuitry to extend dynamic range.

36. The system of claim 34, wherein the non-linear digital detector comprises a digital circuit with different responses for different pixels.

37. The system of claim 34, wherein the non-linear digital detector comprises a digital circuit with detectors having logarithmic response.

* * * * *

UNITED STATES PATENT AND TRADEMARK OFFICE
CERTIFICATE OF CORRECTION

PATENT NO. : 7,550,701 B2  Page 1 of 1
APPLICATION NO. : 10/786443
DATED : June 23, 2009
INVENTOR(S) : W. Thomas Cathey, Jr. and Adam Douglas Greengard It is certified that error appears in the above-identified patent and that said Letters Patent is hereby corrected as shown below:

Column 5, line 32, "OTE," should read --OTF,--;
Column 6, line 12, "improved this" should read --this improved--;
Column 8, line 13, claim 21, "form a final" should read --form a final image.--.

Signed and Sealed this

Twenty-seventh Day of October, 2009

David J. Kappos
*Director of the United States Patent and Trademark Office*